United States Patent [19]

Kuwajima

[11] Patent Number: 4,661,864
[45] Date of Patent: Apr. 28, 1987

[54] MAGNETIC RECORDING AND REPRODUCING APPARATUS

[75] Inventor: Hideki Kuwajima, Kyoto, Japan
[73] Assignee: Matsushita Electric Industrial Co., Ltd., Osaka, Japan
[21] Appl. No.: 724,886
[22] Filed: Apr. 19, 1985
[51] Int. Cl.⁴ .............................................. G11B 5/027
[52] U.S. Cl. ......................................... 360/85; 360/95
[58] Field of Search .................................... 360/85, 95

[56] References Cited

U.S. PATENT DOCUMENTS

| 3,860,960 | 1/1975 | Akamine | 360/85 |
| 4,121,267 | 10/1978 | Hayashi | 360/95 |
| 4,410,919 | 10/1983 | Umeda | 360/95 |

Primary Examiner—A. Michael Chambers
Attorney, Agent, or Firm—Stevens, Davis, Miller & Mosher

[57] ABSTRACT

A magnetic recording and reproducing apparatus has a tape loading mechanism for pulling out a magnetic tape incorporated in a cassette which is loaded in position. A driving motor for the tape loading mechanism is also employed for changing over operation modes of the apparatus, thereby realizing a mechanism which is greatly reduced in size. In particular, power from the driving motor is transmitted to tape loading device through a worm and a worm gear. The worm is adapted to be axially slidable. An operation mode changeover device is moved by sliding the worm. When the tape loading device have pulled out the tape to a predetermined position by the rotation of the driving motor, the tape loading operation is stopped. By further rotating the worm either forwardly or backwardly in relation to the worm wheel which is stopped, the worm slides to set, the mechanism in an operation mode selected from the stop mode, the reproducing mode, the high-speed feed mode and so forth by means of the operation mode changeover device.

3 Claims, 10 Drawing Figures

MAGNETIC RECORDING AND REPRODUCING APPARATUS

BACKGROUND OF THE INVENTION

1. Field of the Invention

The present invention relates to a magnetic recording and reproducing apparatus, such as a videotape recorder, of the type in which a magnetic tape wound on reel hubs received in a cassette is pulled out of the cassette and is caused to travel while contacting a rotary head drum installed outside the cassette, thereby recording or reproducing signals.

2. Description of the Prior Art

In recent years, magnetic recording and reproducing apparatus, such as a cassette type videotape recorder, have been reduced in size and weight. In order to make the mechanism simple, it is consequently general practice to employ separate drives for the following respective means: means for pulling out a magnetic tape from a cassette and winding the tape around a magnetic head such that the tape travels while passing over the head; means for changing over various operation modes from one to another when the tape is running; and means for pressing a pinch roller against a capstan.

The arrangement of a prior magnetic recording and reproducing apparatus will be described hereinunder with reference to FIGS. 1 and 2. First, when a cassette 1 is loaded, tape guide posts 2a, 2b, inclined posts 3a, 3b and a pinch roller 4 are positioned inside the loop of a magnetic tape 5 which is passed in the manner shown by the two-dot chain line in FIG. 1. Then, when the loading of the cassette 1 is detected by a switch (not shown), a loading motor 6 is rotated, and the rotation of the motor 6 is transmitted to a worm wheel 8 which is meshed with a worm 7, whereby a loading ring 10 (see FIG. 2) is rotated counterclockwise through a pinion gear 9. On the other hand, a loading ring 11 is rotated clockwise by a dual gear 12 which is meshed with the pinion gear 9. A base 13a mounting thereon the tape guide post 2a and the inclined post 3a thereon is connected to the loading ring 11 by a rod 18a, while a base 13b mounting thereon the tape guide post 2b and the inclined post 3b is connected to the loading ring 10 by a rod 18b. In consequence, the magnetic tape 5 is gradually pulled out of the cassette 1 by the leading tape guide posts 2a and 2b. The magnetic tape 5 having thus been pulled out is wound around the peripheral surface of a rotary head drum 14 and is thereafter fixed in this position. Then, when the operation mode is changed over to the recording or reproducing mode, a plunger 15 is actuated to pivot a pinch lever 16 equipped with the pinch roller 4 in the clockwise direction, thereby pressing the pinch roller 4 against a capstan 17 to permit the magnetic tape 5 to travel at a constant speed for a desired recording or reproducing operation. In the drawings, reference numerals 19 and 20 respectively denote holders for the pinch lever disposed between the plunger 15 and the pinch lever 16; numeral 21 a compression spring disposed between the holders 19 and 20; numeral 22 tape guides provided on the cassette 1; and numerals 23 and 24 supply and take-up reels, respectively, provided on the cassette 1.

Thus, with the prior arrangement, separate drives are used for each of the various means, that is, the means for pulling out the magnetic tape from the cassette and winding the tape around the magnetic head such that the tape travels while passing over the head, a brake means (not shown) for applying brakes to the reels in various modes when the tape is travelling, and the means for pressing the pinch roller against the capstan. Such an arrangement realizes reduction in size of the apparatus to a certain extent as a result of the simplification of the mechanism. However, further reduction in size of the apparatus is unfavorably limited with the prior arrangement. Additionally, the employment of separate drives for the respective means disadvantageously causes a higher cost and an increase in weight of the apparatus as a whole. On the other hand, a prior magnetic recording and reproducing apparatus in which respective operating means are actuated by separate drives requires a disadvantageously large space to accommodate a mechanism for changing over the actuating means from one to another, which fact constitutes a great handicap in the quest to reduce the size of the apparatus.

SUMMARY OF THE INVENTION

In view of the above-described disadvantages of the prior art, it is a primary object of the present invention to provide a magnetic recording and reproducing apparatus which is simple in construction and is small-sized and light weight to realize a low manufacturing cost.

To this end, according to the invention, there is provided a magnetic recording and reproducing apparatus which is arranged such that a magnetic tape wound on a reel which is incorporated in a cassette is pulled out of the cassette and is caused to travel while contacting a magnetic head which is installed outside the cassette, thereby recording or reproducing signals, the apparatus comprising: a first gear disposed in such a manner as to be rotatable about a first shaft provided on a board as well as slidable in the axial direction of the first shaft, the first gear having a tooth trace formed on a cylinder such as to draw a spiral curve; a second gear meshed with the first gear and rotatable about a second shaft provided on the board; driving means for driving the first gear; operation changeover means adapted to be driven by the movement of the first gear in the axial direction of the first shaft such as to change over the operation modes of the apparatus; and tape loading means adapted to be driven by the rotation of the second means and to pull out the magnetic tape from the cassette to such a degree that the tape is able to travel while contacting the magnetic head.

The above and other objects and arrangements of the present invention will become clear from the following practical description taken in conjunction with the accompanying drawings.

BRIEF DESCRIPTION OF THE DRAWINGS

FIGS. 3 to 5 being plan views of a magnetic recording and reproducing apparatus according to the invention, FIG. 6 being an enlarged perspective view of an essential part of the magnetic recording and reproducing apparatus, FIGS. 7 and 8 being front and side elevational views, respectively, of the driver section in the magnetic recording and reproducing apparatus, and FIGS. 9 and 10 being plan views of blocking means and cancelling means, respectively.

DESCRIPTION OF THE PREFERRED EMBODIMENT

Figure 1:
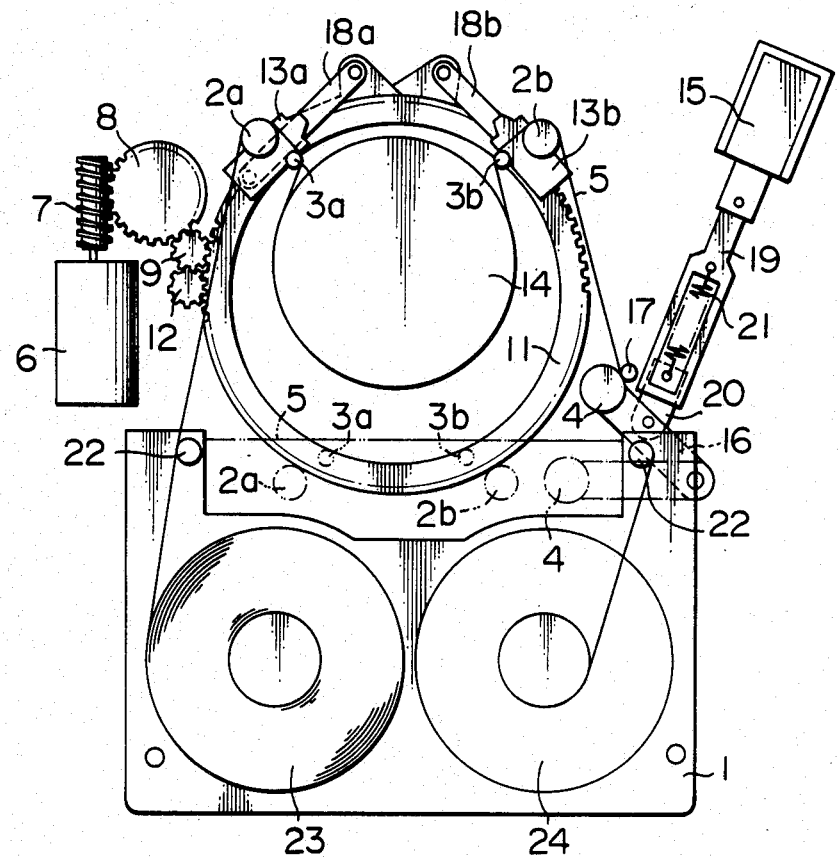
FIG. 1 is a plan view of a prior magnetic recording and reproducing apparatus.
Figure 2:
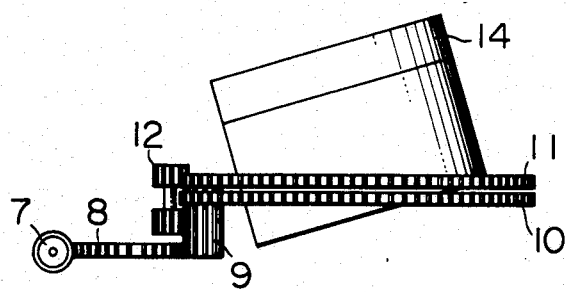
FIG. 2 is a side elevational view of an essential part of the prior magnetic recording and reproducing apparatus shown in FIG. 1.
Figure 3:
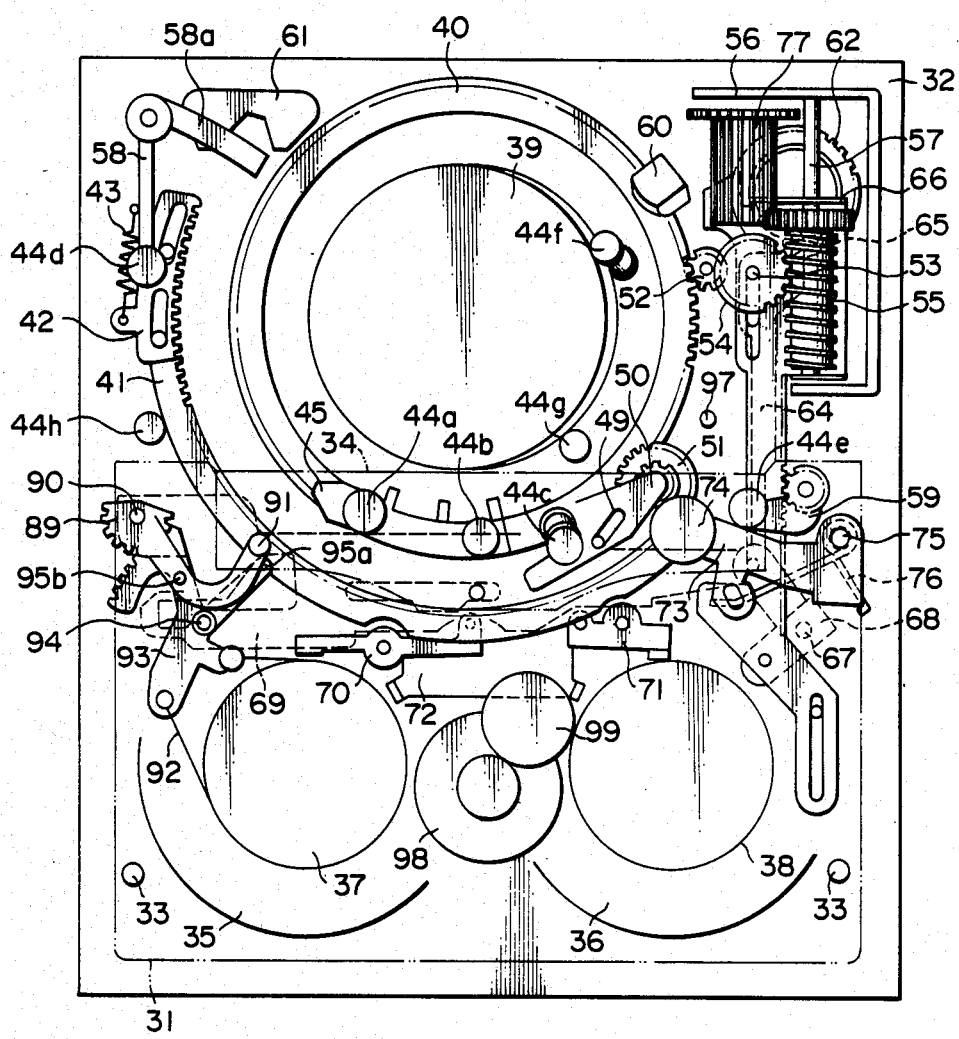
FIGS. 3 to 10 inclusive show one embodiment of the present invention.
Figure 4:
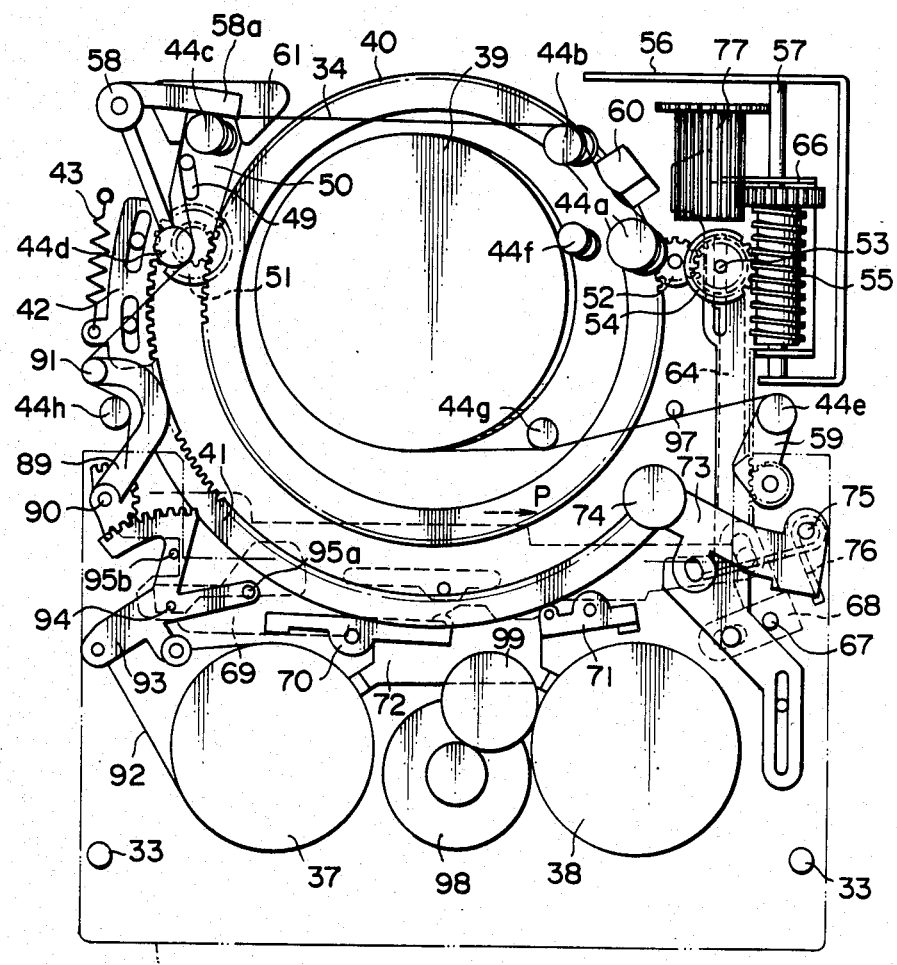

One embodiment of the present invention will be described hereinunder with reference to the drawings (FIGS. 3 to 10).

A description will first be made of a tape loading means. A cassette 31 is horizontally loaded and positioned on a plurality of positioning pins 33 provided on a board 32, such as a chassis. It is to be noted that this cassette loading operation causes a front cover (not shown) of the cassette 31 to be opened. With the cassette loaded, a magnetic tape 34 inside the cassette 31 is passed in the manner shown by the two-dot chain line in FIG. 3. The cassette loading operation further causes a supply reel 35 and a take-up reel 36 inside the cassette 31 to be respectively engaged with a supply reel plate 37 and a take-up reel plate 38 which are disposed on the board 32. On the other hand, a rotary head drum 39 is disposed centrally forwardly of the loaded cassette 31 and is inclined by a lead angle such that the magnetic tape 34 coming out of the rotary head drum 39 is caused to advance horizontally while keeping its plane perpendicular to the board 32 upon completion of the tape loading operation. A loading ring 40 is disposed at the outer periphery of the rotary head drum 39 and at a position where the loading ring 40 is eccentric with respect to the rotary head drum 39. An internal gear 41 secured to the board 32 is disposed at a position concentric with the loading ring 40. Reference numeral 42 denotes an internal gear formed concentric with the internal gear 41 and disposed on the board 32 in such a manner as to be slidable in the circumferential direction. The internal gear 42 is constantly pulled in one direction by the action of a spring 43. A main base 45 having two tape guide posts 44a and 44b for guiding the magnetic tape 34 is disposed above the loading ring 40 (see FIG. 6). The main base 45 is connected to the loading ring 40 through a connecting rod 46. Further, hooks 47 provided on the main base 45 are movably engaged with a loading guide 48 which is formed along the lead on the rotary head drum 39. A subsidiary base 50 having a tape guide post 44c and an inclined post 49 is disposed between the loading ring 40 and the internal gear 41. A planetary gear 51 is rotatably mounted on the lower side of the subsidiary base 50, and comprises gears which are concentrically formed and are different from one other in the number of teeth. The gear of the planetary gear 51 having fewer teeth is meshed with the loading ring 40, the gear of the planetary gear 51 having larger number of teeth is meshed with the internal gear 41.

The loading ring 40 is meshed through a pinion gear 52 with a gear 54 which is rotatable about a shaft 53 and has a worm wheel portion and a spur gear portion formed concentric with the worm wheel portion. The gear 54 is further meshed with a gear 55 which has a worm portion and a spur gear portion coaxially formed with the worm portion. The gear 55 is mounted in such a manner as to be rotatable about a shaft 57 secured to a gear holder 56 provided on the board 32 as well as slidable in the axial direction of the shaft 57. Reference numerals 58 and 59 denote guide post arms which respectively have tape guide posts 44d and 44e. Reference numeral 60 represents an erasing head, while numeral 61 denotes a V-stopper which serves to fix the subsidiary base 50 when the tape loading operation has been completed. A cam gear 62 meshes with the spur gear portion of the gear 54 through the pinion gear 52 and an intermediary gear 63. A guide post drawing out rod 64 has a rack portion adapted to mesh with the pinion portion of the guide post arm 59 and a cam follower pin 65 corresponding to the cam of the cam gear 62. The arrangement is such that the cam gear 62 is rotated as the gear 54 is rotated in the tape loading mode and, consequently, the guide post arm 59 pivots clockwise and stops.

The following is a description of operation switchover means for switching over the operation modes of the apparatus. A worm holder 66 is guided by the shaft 57 to be slidable along the shaft. The worm holder 66 is connected to an L-shaped lever 68 which is disposed on the board 32 in such a manner as to be pivotal about a pivot 67. A main rod 69 has a cam portion adapted to switch over a supply reel soft brake 70, a take-up reel soft brake 71 and a main brake 72 in accordance with each of the operation modes. The main rod 69 has a further cam portion adapted to release a tension regulator in a desired mode which regulator applies a predetermined tension to the magnetic tape 34 in a recording or reproducing operation. A pinch lever 73 has a pinch roller 74 and is pivotal about a pivot 75. Reference numeral 76 designates a pinch roller pressing spring.

Drive means for driving the gear 55 will next be described. A reduction gear 77 comprises gears which are coaxially formed and are different from each other in the number of teeth. The reduction gear 77 is meshed with the spur gear portion of the gear 55. A pulley 78 has a gear portion and a pulley portion coaxial with the gear portion. The pulley 78 is meshed with the reduction gear 77, and is interlocked with a motor pulley 81 of a loading motor 80 through a belt 79.

The following is a description of blocking means for blocking the sliding of the gear 55 in the axial direction of the shaft 57. A detent arm 82 has a detent roller 83 and is provided coaxial with the pinion gear 52 to be swingable. When the apparatus is in the tape loading mode, the movement of the worm holder 66 is prevented by the detent roller 83.

Figure 10:
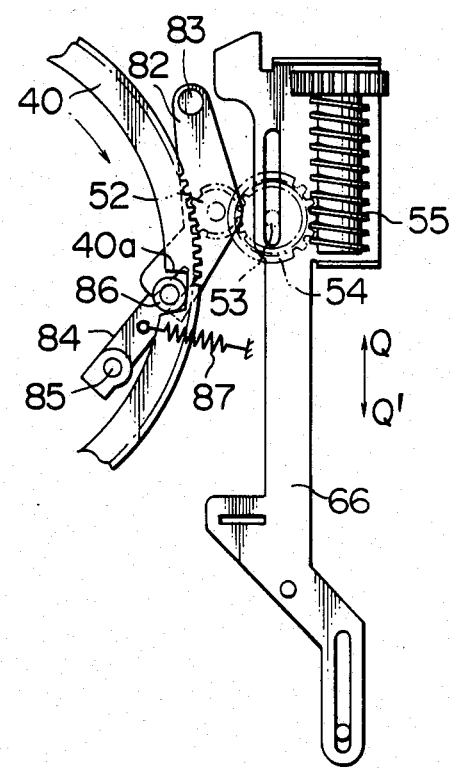

The following is a description of release means for cancelling the operation of the blocking means which blocks the sliding of the gear 55 in the axial direction of the shaft 57, and rotation blocking means for preventing the rotation of the gear 54. A detent arm 84 is pivotal about a pivot 85 and has a detent roller 86 which rotates contacting the inside surface of the loading ring 40. The detent arm 84 is constantly biased by a detent spring 87 such as to pivot in the clockwise direction. Further, a pivot 88 for the detent roller 86 corresponds to a slit portion 82a formed in the detent arm 82. Thus, as shown in FIG. 10, when the tape loading operation is started and the loading ring 40 is rotated to a position where the tape loading operation is completed, the detent roller 86 enters a cam groove 40a provided on the loading ring 40, whereby the loading ring 40 is fixed. As a result, the pinion gear 52 and the gear 54 are also fixed. On the other hand, the detent arm 82 which is interlocked with the detent arm 84 pivots counterclockwise, thereby allowing the worm holder 66 to move.

The tension regulator section will now be described. A tension arm 89 is disposed in such a manner as to pivot about a pivot 90. A tension post 91 is adapted to detect the tape tensioning by contacting the magnetic tape 34 when it is travelling. A tension band 92 is wound around the supply reel plate 37 such as to apply a predetermined tape tension to the magnetic tape 34 when it is travelling. A sector gear 93 is disposed in such a manner as to pivot about a pivot 94. The sector gear 93 has a gear portion adapted to mesh with a gear portion of the tension arm 89, and cam pins 95a and 95b which correspond to respective cam portions of the main rod 69. Both ends of the tension band 92 are pivotally attached to respective portions of the sector gear 93 which portions are differently distant from the pivot 94, whereby the braking torque applied by the tension band 92 in a recording or reproducing operation is made larger than the braking torque applied by the tension band 92 in a reverse reproducing operation. With the prior arrangement, one end of the tension band 92 is secured to the board 32 and, therefore, when a reverse reproducing operation is performed with such arrangement, the tension band 92 bites into the supply reel plate 37, so that the supply reel plate 37 can not be rotated to wind the magnetic tape 34 therearound. For this reason, it has conventionally been necessary to forcibly release cancel the tension band 92 in a reverse reproducing operation, so that with the prior arrangement it has therefore been necessary to provide a mode which is different from the recording and reproducing mode. However, with the arrangement in accordance with this embodiment, the tension band 92 can be prevented from biting into the supply reel plate 37 when it is rotated counterclockwise in a reverse reproducing operation. Thus, it is advantageously possible in the apparatus of the invention to eliminate the need of providing a reverse reproducing mode as is required for the conventional apparatus.

The following is a description of the operation of the magnetic recording and reproducing apparatus constructed as above in accordance with this embodiment.

Figure 7:
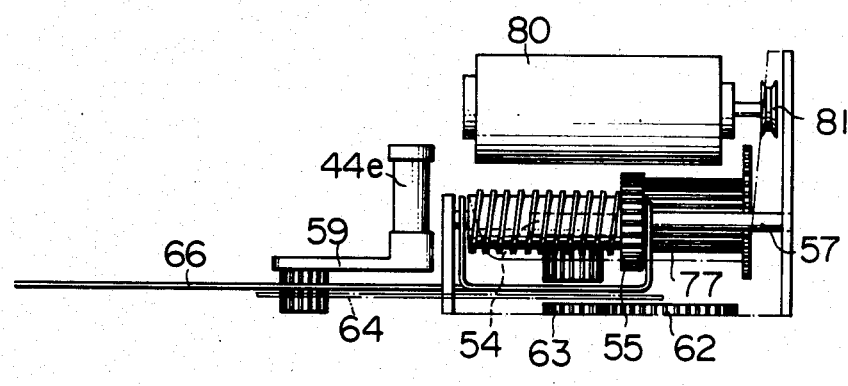
Figure 8:
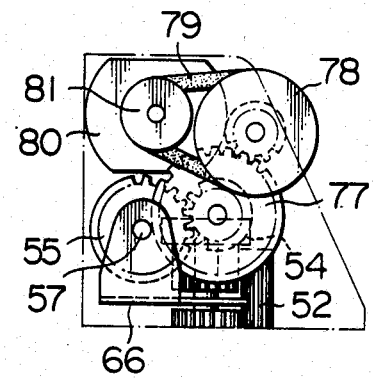
Figure 9:
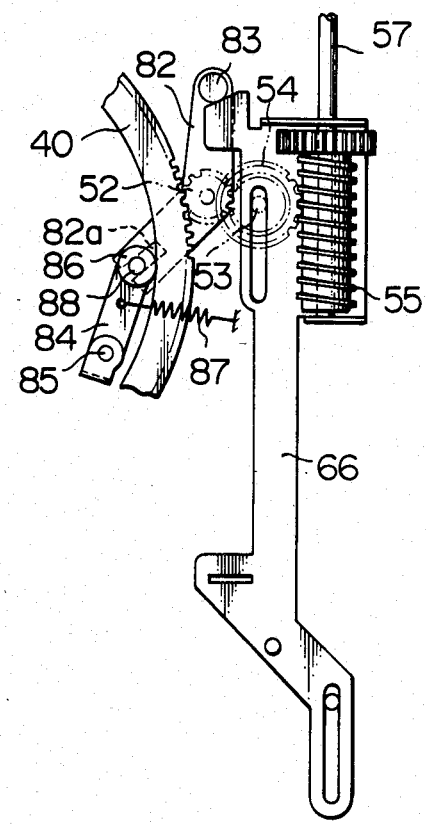

The tape loading operation will first be described. When the cassette 31 is loaded, the leading tape guide posts 44a to 44f, the inclined post 49, the tension post 91 and the pinch roller 74 are positioned inside the loop of the magnetic tape 34 which is passed in the manner shown by the two-dot chain line in FIG. 3. When the loading of the cassette 31 is detected by the switch, the loading motor 80 shown in FIGS. 7 and 8 is rotated forwardly, and the rotation of the motor 80 is transmitted to the gear 55 after being decelerated by the pulley 78 and the reduction gear 77. At this time, the gear 55 is prevented by the detent arm 82 from moving in the axial direction of the shaft 57. For this reason, the rotation of the gear 55 is transmitted to the gear 54, whereby the loading ring 40 is drivingly rotated clockwise through the pinion gear 52. As a result, the magnetic tape 34 is passed round the leading tape guide post 44a and is then gradually pulled out of the cassette 31 as the tape guide post 44a moves. The magnetic tape 34 thus pulled out is gradually wound around the peripheral surface of the rotary head drum 39 in the clockwise direction. On the other hand, in synchronism with the clockwise rotation of the loading ring 40, the tape guide post 44c and the inclined post 49 which are disposed on the subsidiary base 50 are moved clockwise at a lower speed by the action of the planetary gear 51 and the internal gear 41 than that of the loading ring 40. When the leading tape guide post 44a reaches the position shown in FIG. 4, the tape guide post 44c also reaches the position shown in FIG. 4. Then, the tape guide post 44a is fixed by the resilient force of the compression spring 96 shown in FIG. 6. On the other hand, the tape guide post 44c is fixed by the V-stopper 61. Thereafter, the rotation of the loading ring 40 is transmitted to the internal gear 42 through the planetary gear 51 to expand the spring 43, thereby fixing the tape guide post 44c. On the other hand, the tape guide post 44d abuts against the lever portion 58a of the guide post arm 58 and the head portion of the tape guide post 44c when the tape guide post 44c comes close to the position shown in FIG. 4. When the tape guide post 44c is fixed by the V-stopper 61, the guide post arm 58 is pivoted counterclockwise and is fixed at a predetermined position. When the rotation of the gear 54 causes rotation of the cam gear 62 and the guide post drawing out rod 64 is moved by the cam of the cam gear 62 to rotate the guide post arm 59 anticlockwise, thereby fixing the tape guide post 44c, the tape guide post 44e is stopped and fixed at that position. When the loading ring 40 has been rotated to a position where the springs 43 and 96 fully bias their respective tape guide posts, the detent roller 86 enters the cam groove 40a of the loading ring 40 as shown in FIG. 10, whereby the rotation of the loading ring 40 is suspended and the loading ring 40 is locked at that position. At this time, the worm holder 66 is released from the state wherein the detent roller 83 prevents the holder from sliding, as described above. Consequently, by virtue of the screw effect of the gears 54 and 55, the gear 55 is actuated to slide in the direction of the arrow Q shown in FIG. 10. As a result, the main rod 69 is moved rightwardly (in the direction of the arrow P) and the tension arm 89 is moved to the position shown in FIG. 4, whereby the main brake 72 brakes the take-up reel plate 38 and the supply reel plate 37. At this time, the completion of the tape loading operation is detected by the switch, and the rotation of the loading motor 80 is suspended. Thus, the tape loading operation is completed.

Figure 5:
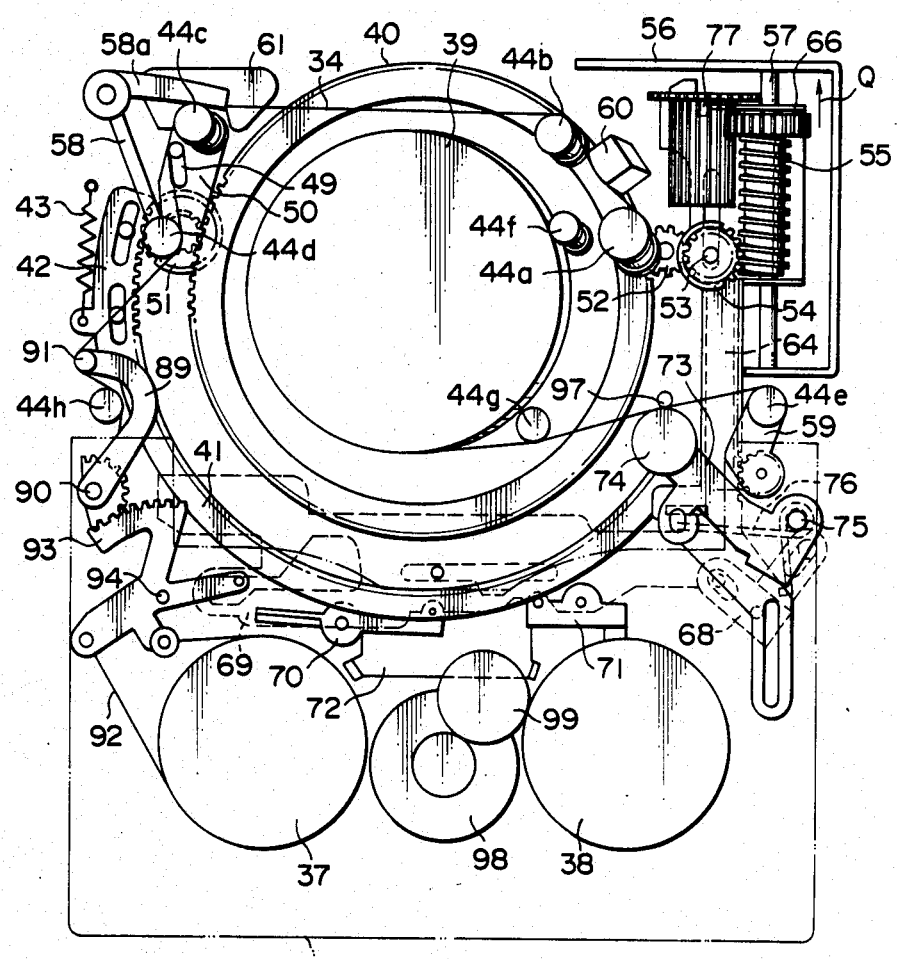
Figure 6:
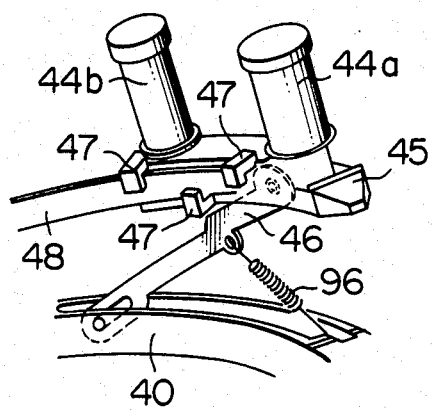

The pinch roller pressing operation will now be described. As the loading motor 80 is further rotated forwardly after the completion of the above-described tape loading operation, the gear 55 is, as shown in FIG. 5, further moved in the direction of the arrow Q by the screw effect of the gears 54 and 55, whereby the pinch roller 74 is pressed against a capstan 97. Thus, the reproducing or recording mode is established. On the other hand, the fast forward mode and the rewinding mode are caused by sliding the gear 55 to be set between the tape loading completion mode and the pinch roller pressing mode.

It is to be noted that, in the drawings, reference numerals 44g and 44h denote tape guide posts, 98 a reel motor, and 99 an idler.

The changeover between the operation modes will now be described in detail. When the cassette 31 is loaded after the power source for the apparatus has been turned on, or when the power source is turned on after the cassette 31 has been loaded, the switch for detection of cassette loading generates an output to rotate the loading motor 80 forwardly, whereby the tape loading operation is performed as described above. During this tape loading operation, when the loading ring 40 reaches a predetermined position, it is locked. As the loading motor 80 is continuously rotating, the gear 55 slides in the direction of the arrow Q, whereby the main brake 72 is actuated as described above. Thereafter, the rotation of the loading motor 80 is suspended, and the tape loading operation is completed. This is the stop mode (see FIG. 4).

The reproducing mode and the recording mode are realized by further forwardly rotating the loading motor 80 from the stop mode so that the gear 55 is further caused to slide in the direction of the arrow Q and the pinch roller 74 is pressed against the capstan 97 and further the main brake 72 is released (see FIG. 5).

The modes for feeding a tape at high speed, that is, the so-called fast forward and rewinding modes, are realized by reversing the loading motor 80 from the stop mode such that the gear 55 is moved from the position shown in FIG. 10 in the direction of the arrow Q' (it is to be noted that the loading ring 40 is maintained in the locked state), thereby separating the pinch roller 74 from the capstan 97.

In other words, with the above-described mechanism, the reproducing (or recording) mode or a high-speed feed mode is reached via the state in which the tape loading operation is completed (the stop mode). A major feature of the present invention resides in that the changeover between these operation modes is realized by rotating the loading motor 80 either forwardly or backwardly and is accomplished by the mechanism incorporating the worm and the worm wheel which are relatively small in size.

It is to be noted that it is possible to readily arrange the means for detecting the fact that the mode has been changed over from the stop mode to the fast forward or rewinding mode by the use of, for example, a switch (not shown) which is actuated by a projection formed on the changeover rod.

According to this embodiment, as described above, the tape loading operation and the operation of changing over the operation modes of the apparatus are realized by a single drive source with a simple arrangement by employing the drive mechanism constituted by the gears 54 and 55.

As described above, the present invention advantageously makes it possible to simplify the arrangement of the apparatus and to reduce the size and weight thereof. Further, according to the invention, the operation of changing over the operation modes of the apparatus is rapidly and smoothly effected by virtue of the sliding motion of the first gear. By virtue of this advantageous effect, it is conveniently possible to perform the braking operation effected by the main brake at a satisfactorily high speed without complicating the mechanism. Furthermore, the employment of the drive mechanism comprising the first and second gears makes it possible for a single drive source to realize both the tape loading operation and the operation of changing over the operation modes of the apparatus with a simple arrangement.

What is claimed is:

1. A magnetic recording and reproducing apparatus, in which a magnetic tape wound on a reel built in a cassette is pulled out of said cassette and caused to travel while contacting a magnetic head installed outside said cassette, thereby recording or reproducing signals, said apparatus comprising:
   a first shaft provided on a board:
   a first gear provided in a manner as to be rotatable about said first shaft provided on said board as well as to be slidable in the axial direction of said first shaft, said first gear having a tooth profile formed on a cylinder to generate a spiral curve;
   a second gear meshed with said first gear and rotatable about a second shaft fixedly provided on said board;
   driving means for driving said first gear in rotation;
   operation changeover means adapted to be driven by the movement of said first gear in the axial direction of said first shaft for controlling driving movement of said magnetic tape in said apparatus; and
   tape loading means adapted to be driven by the rotation of said second gear, when said first gear is not moving axially, for pulling out said magnetic tape from said cassette to a position where said magnetic tape is able to record or reproduce signals while contacting said magnetic head.

2. A magnetic recording and reproducing apparatus according to claim 1, further comprising:
   first preventing means for preventing said first gear from sliding axially of said first shaft;
   release means for releasing said first gear from the state in which it is prevented by said first preventing means from sliding axially of said first shaft, after said magnetic tape is pulled out of said cassette to a position where said magnetic tape is permitted to travel while contacting said magnetic head provided outside said cassette; and
   second preventing means for preventing said second gear from rotating.

3. A magnetic recording and reproducing apparatus, in which a magnetic tape wound on a reel built in a cassette is pulled out of said cassette and caused to travel while contacting a magnetic head installed outside said cassette, thereby recording or reproducing signals, said apparatus comprising:
   a worm gear rotatably mounted on a first shaft provided substantially parallel to a main board and being reciprocatively slidable in first and second directions along said first shaft;
   a worm wheel rotatably mounted on a second shaft provided on said main board and adapted to mesh with said worm gear;
   a driving motor for applying a driving force to said worm gear;
   tape loading means for pulling out said magnetic tape from said cassette by making use of a torque of said worm wheel which is driven by the forward rotation of said worm gear and for loading said magnetic tape at a position where it can travel while contacting said magnetic head;
   means for stopping the operation of said tape loading means when said magnetic tape reaches a predetermined position during the tape loading operation where said magnetic tape is permitted to travel while contacting said magnetic head installed outside said cassette;
   first means for preventing said worm gear from sliding axially on said first shaft;
   release means for releasing said worm gear from the state in which it is prevented by said first preventing means from sliding axially of said first shaft, after said magnetic tape is pulled out of said cassette to said predetermined position;
   second means for preventing said worm wheel from rotating; and
   a mode changeover member adapted to be driven by the axial movement of said worm gear,
   whereby, when the operation of said tape loading means is prevented, rotation of said worm wheel is stopped, and said worm gear having rotated in the forward direction slides in the forward direction of said first shaft to drive said mode changeover member and to press against a reel plate brake, thereby establishing a stop mode, and wherein said driving motor rotates said worm gear in the forward or backward direction to perform engagement and disengagement of a pinch roller with a capstan, and releasing of the brake, thereby performing a changeover to a reproducing (recording) mode, a fast node or a rewinding mode from said stop mode.

* * * * *